United States Patent
Hiasa

(10) Patent No.: US 7,667,445 B2
(45) Date of Patent: Feb. 23, 2010

(54) INTEGRATED CIRCUIT FOR CONTROLLING A SWITCHING POWER SUPPLY

(75) Inventor: Nobuyuki Hiasa, Nagano (JP)

(73) Assignee: Fuji Electric Device Technology Co., Ltd., Tokyo (JP)

(*) Notice: Subject to any disclaimer, the term of this patent is extended or adjusted under 35 U.S.C. 154(b) by 291 days.

(21) Appl. No.: 11/472,545

(22) Filed: Jun. 22, 2006

(65) Prior Publication Data

US 2007/0007936 A1      Jan. 11, 2007

(30) Foreign Application Priority Data

Jun. 29, 2005    (JP)    ............................... 2005-189689

(51) Int. Cl.
*G05F 1/40*    (2006.01)
*G05F 1/56*    (2006.01)

(52) U.S. Cl. .................. 323/284; 323/271; 323/285

(58) Field of Classification Search .................. 323/268, 323/271, 282, 284, 285, 288; 363/20, 21.01, 363/21.07, 21.1, 21.15, 21.18
See application file for complete search history.

(56) References Cited

U.S. PATENT DOCUMENTS

| 4,734,771 | A | * | 3/1988 | Lendaro et al. | 348/730 |
| 5,548,206 | A | * | 8/1996 | Soo | 323/284 |
| 6,111,762 | A | | 8/2000 | Igarashi et al. | |
| 6,768,655 | B1 | * | 7/2004 | Yang et al. | 363/21.01 |
| 7,064,968 | B2 | * | 6/2006 | Choi et al. | 363/97 |
| 2002/0080634 | A1 | | 6/2002 | Nozawa et al. | |

FOREIGN PATENT DOCUMENTS

| JP | 2956681 | 7/1999 |
| JP | 2002-209381 | 7/2002 |

* cited by examiner

*Primary Examiner*—Matthew V Nguyen
(74) *Attorney, Agent, or Firm*—Rabin & Berdo, PC

(57) ABSTRACT

An integrated circuit for controlling a switching power supply includes a signal input terminal in addition to a switching input terminal that is also provided in a conventional integrated circuit and is a terminal to switch IC operation modes using an external control signal. The switching input terminal signal is made valid when the signal input terminal voltage is higher than a threshold voltage, such that mode switching using an external control signal is enabled. When the signal input terminal voltage is lower than the threshold voltage, mode switching is automatically conducted by switching a MOSFET ON or OFF using output signals of portions of a comparator connected to a feedback terminal to which an output voltage of a power supply device is applied.

7 Claims, 6 Drawing Sheets

INTEGRATED CIRCUIT FOR CONTROLLING A SWITCHING POWER SUPPLY

CROSS-REFERENCE TO RELATED APPLICATION

This application is based on, and claims priority to, Japanese Patent Application No. 2005-189689, filed on Jun. 29, 2005, the contents of which are incorporated herein by reference.

BACKGROUND OF THE INVENTION

1. Field of the Invention

The present invention relates to an integrated circuit (IC) for controlling a switching power supply.

2. Description of the Background Art

One example of recent efforts to reduce the burden on the environment is reducing the standby power consumption of electronic products. Switching power supplies, which convert a commercial power supply to a direct current in order to supply power to electronic products, are also no exception. And because there are many products to which timers and remote controllers are added, reducing power consumption during standby is becoming particularly urgent.

In a switching power supply having a relatively low output power, standby power consumption can be reduced by lowering the switching frequency and reducing switching loss during standby. Further, in such a relatively low power output switching power supply, a power supply for a normal load and a power supply for standby (sub-power supply) can be provided, and standby power consumption can be reduced by switching between the power supplies and causing them to operate in response to the state of the load.

One way of reducing standby power consumption with a single switching power supply, without using a sub-power supply, is a method using a switching power supply control IC having two modes—a normal operating mode and a standby operating mode. With a dedicated terminal, it is possible to switch between these two modes with a control signal external to the IC. In some cases where the external switching control signal is generated with a power supply device, and in other cases a signal from a microcomputer or the like is utilized (e.g., see Japanese Patent No. 2,956,681).

FIG. 5 shows an example of a control IC circuit having a dedicated terminal to which an external switching control signal is inputted, and which can be used as a control circuit of the converter system disclosed in Japanese Patent Application Publication (JP-A) No. 2002-209381, which employs a switching method that is the same as that in the conventional example described in Japanese Patent No. 2,956,681.

In the control IC shown in FIG. 5, continuous switching is implemented in the normal operating mode, and burst switching using a burst frequency and a burst ON period created inside the control IC is implemented in the standby operating mode. Further, burst switching is an operation that repeatedly starts and stops high-frequency switching at a burst frequency that is lower than the frequency of the high-frequency switching operation. This will be described with reference to FIG. 5.

The double circles shown in FIG. 5 represent terminals of the control IC. FB, CB and STB at the left side of FIG. 5 are input terminals, and OUT at the right side of FIG. 5 is an output terminal that drives the gate of a power MOSFET. Ordinarily, a photodiode or a phototransistor is connected with respect to GND (ground), and a return signal corresponding to the output voltage of the power supply is inputted to the FB terminal. This signal and an oscillation waveform that is an internal oscillation circuit (OSC) output are inputted to a comparator represented by the PWM portion, whereby a pulse having a width corresponding to the splitting of each signal is generated. This pulse becomes an output pulse for conducting pulse width modulation (PWM) control where the pulse width changes due to the return signal corresponding to the output voltage of the power supply.

A capacitor for determining the burst oscillation frequency in the standby operating mode is connected to the CB terminal. A burst circuit BURSTOSC switches between a constant sink/source current in accordance with the terminal voltage and outputs this to the CB terminal. The sink/source current is outputted with respect to the capacitor connected to the CB terminal, whereby triangle wave oscillation is conducted. The comparator represented by the OnTB portion compares the FB terminal voltage and the CB terminal voltage in the same manner that the PWM control pulse is generated, and generates a pulse with a width corresponding to the splitting of both voltages. The frequency of this pulse becomes the burst frequency, and the pulse width becomes the burst ON period.

The STB terminal is an input terminal for switching the operating modes of the control IC with an external signal, and inputs one of a High and a Low voltage. When the STB terminal voltage is High, the output signal of the OnTB portion is not transmitted from the next stage on by the OR circuit to which the STB terminal voltage is inputted. Thus, a pulse that is the same as the PWM portion output is outputted to the OUT terminal. This condition is called the normal operating mode, and the switching frequency at this time (i.e., the oscillation frequency of the circuit OSC) is f_OSC.

When the STB terminal voltage is Low, the OR circuit causes the output signal of the OnTB portion to be transmitted from the next stage on. Thus, AND outputs of the PWM portion and the OnTB portion appear at the OUT terminal. Here, assuming that f_OSCB represents the oscillation frequency determined by the circuit BURSTOSC and the CB terminal capacitor, f_OSCB is the burst frequency and is set to be about ¹⁄₁₀₀ or less with respect to f_OSC. Performing the AND operation between the high frequency pulse and the low frequency pulse in this manner implements burst switching.

As shown in FIG. 6, the circuit OSC comprises comparators CP1 and CP2, a reset/set flip-flop RSFF, inverters I1 and I2, two constant current circuits Ict, two switches SW, and a capacitor C. The circuit OSC uses the comparators CP1 and CP2 to compare the output voltage Vct with a predetermined set value, charge or discharge the capacitor C in accordance with the result, and output the triangle wave signal that is illustrated.

The circuit BURSTOSC is configured in exactly the same manner as the circuit OSC shown in FIG. 6. However, because their circuit constants are mutually different (e.g., the switching frequency f_OSC is higher than the burst frequency f_OSCB), the OSC current Ict is made larger than the Ict of the BURSTOSC so that the external capacitor can be quickly charged/discharged. That which finally determines the frequency is the capacitance value of the external capacitor.

In the circuit shown in, FIG. 5, it is necessary to provide a signal generating circuit inside the switching power supply to input a signal from outside of the control IC in order to switch between the normal operating mode and the standby operating mode. Even when the signal generating circuit is outside the switching power supply, it is necessary to provide a circuit for receiving the signal inside the control IC. Thus, there is the problem that the number of parts of the device itself is increased.

SUMMARY OF THE INVENTION

It is an object of the present invention to provide a control IC where a normal operating mode and a standby operating mode can be switched between without increasing the number of parts. It is also an object of the present invention to provide a control IC that is also provided with an automatic switching function while leaving the manual switching function with an external control signal that conventional ICs have.

In order to solve this problem, a first aspect of the invention provides an integrated circuit for controlling a switching power supply, the integrated circuit judging whether or not the load is light with a comparison signal that is compared with a triangle wave or a saw-tooth wave by a PWM comparator and switching between a standby operating mode and a normal operating mode. The comparison signal inputted to the PWM comparator is a signal that is fed back from an output voltage for PWM control, but it is also a signal relating to the size of the load. That is, when the load of the power supply is heavy, the on-duty of the PWM control signal becomes larger in order to supply more power, and this is because the comparison signal becomes higher. Conversely, when the load of the power supply is light, it suffices for a little power to be supplied. For this reason, the on-duty of the PWM control signal becomes smaller, and this is because the comparison signal becomes smaller.

In a second aspect of the invention, the integrated circuit may include: a first setting terminal that manually sets, without recourse to the comparison signal, switching between the standby operating mode and the normal operating mode; and a second setting terminal that sets the switching between the standby operating mode and the normal operating mode to be automatically conducted with the comparison signal or to be manually conducted without recourse to the comparison signal.

In a third aspect of the invention, the second setting terminal may include a function as a threshold voltage setting terminal when automatically moving from the normal operating mode to the standby operating mode and is configured such that the threshold voltage is adjustable from the outside.

In a fourth aspect of the invention, the threshold voltage may be generated by dividing a power supply voltage using resistors.

In a fifth aspect of the invention, the integrated circuit may include a terminal that can set a delay time until moving to an actual operating mode after detecting an operating mode switching signal.

In a sixth aspect of the invention, the delay time may be generated by a charge/discharge circuit comprising a constant current circuit, a switching element and a capacitor.

In a seventh aspect of the invention, the comparison signal may be a signal fed back from a secondary side of an insulated switching power supply to a primary side via a photocoupler.

In an eighth aspect of the invention, the comparison signal may be an error signal generated by an error amp from a reference voltage and a signal fed back from an output of a non-insulated switching power supply.

According to the present invention, because the mode switching signal does not have to be generated outside of the control integrated circuit, there is the advantage that switching between the normal operating mode and the standby operating mode can be realized with a configuration having a minimum number of parts, such as a MODE terminal voltage capacitor and a circuit that generates a voltage that is input to the ATSTB terminal.

Further, due to the ATSTB terminal, the integrated circuit pertaining to the invention can also accommodate conventional switching resulting from a switching control signal generated outside of the control IC.

DETAILED DESCRIPTION OF THE INVENTION

Figure 1:
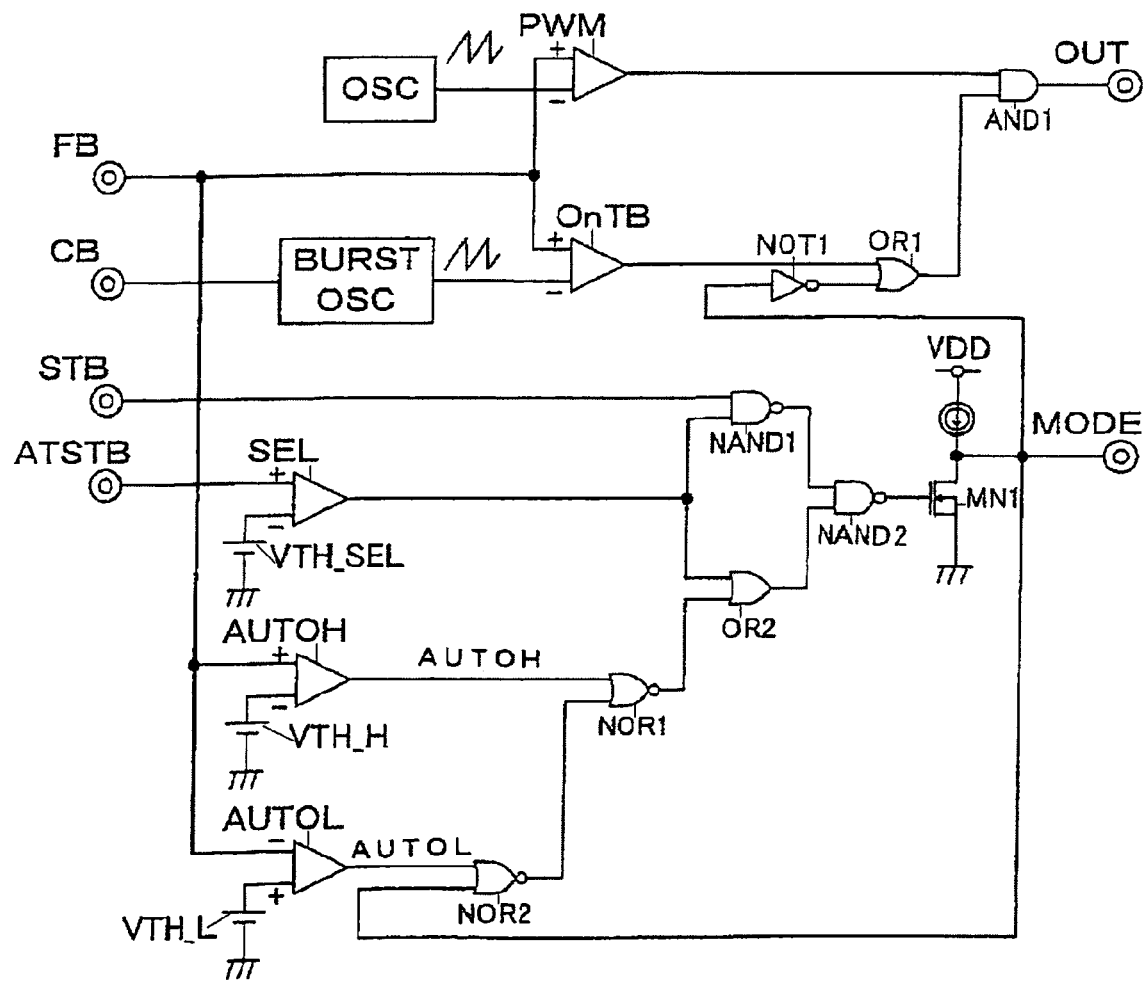
FIG. 1 is circuit configuration diagram showing a first embodiment of the invention.
Figure 5:
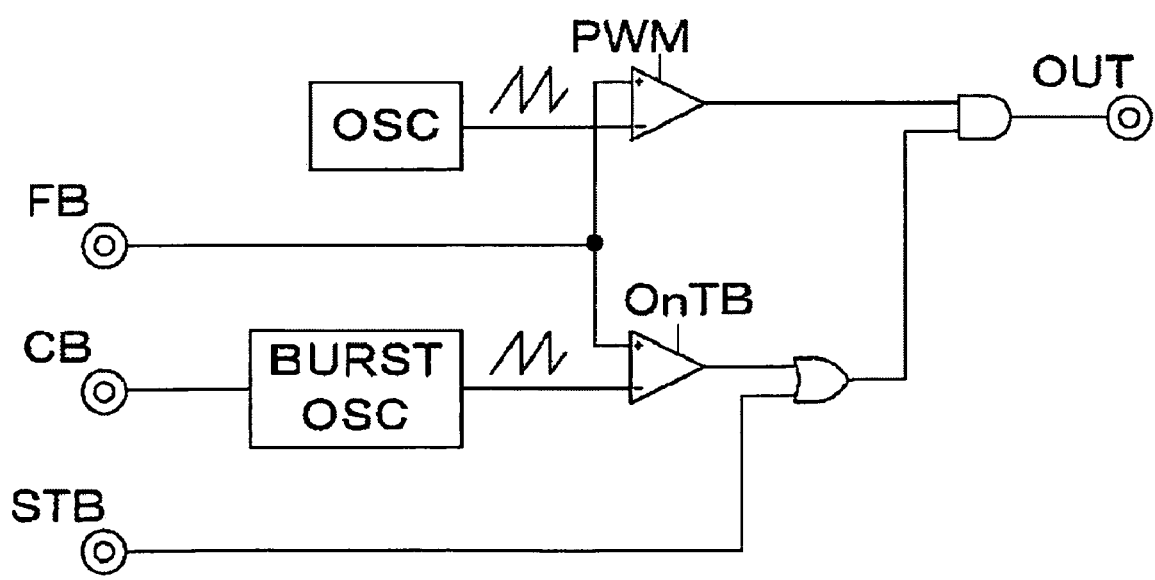
FIG. 5 is a circuit configuration diagram showing a conventional example.
Figure 6:
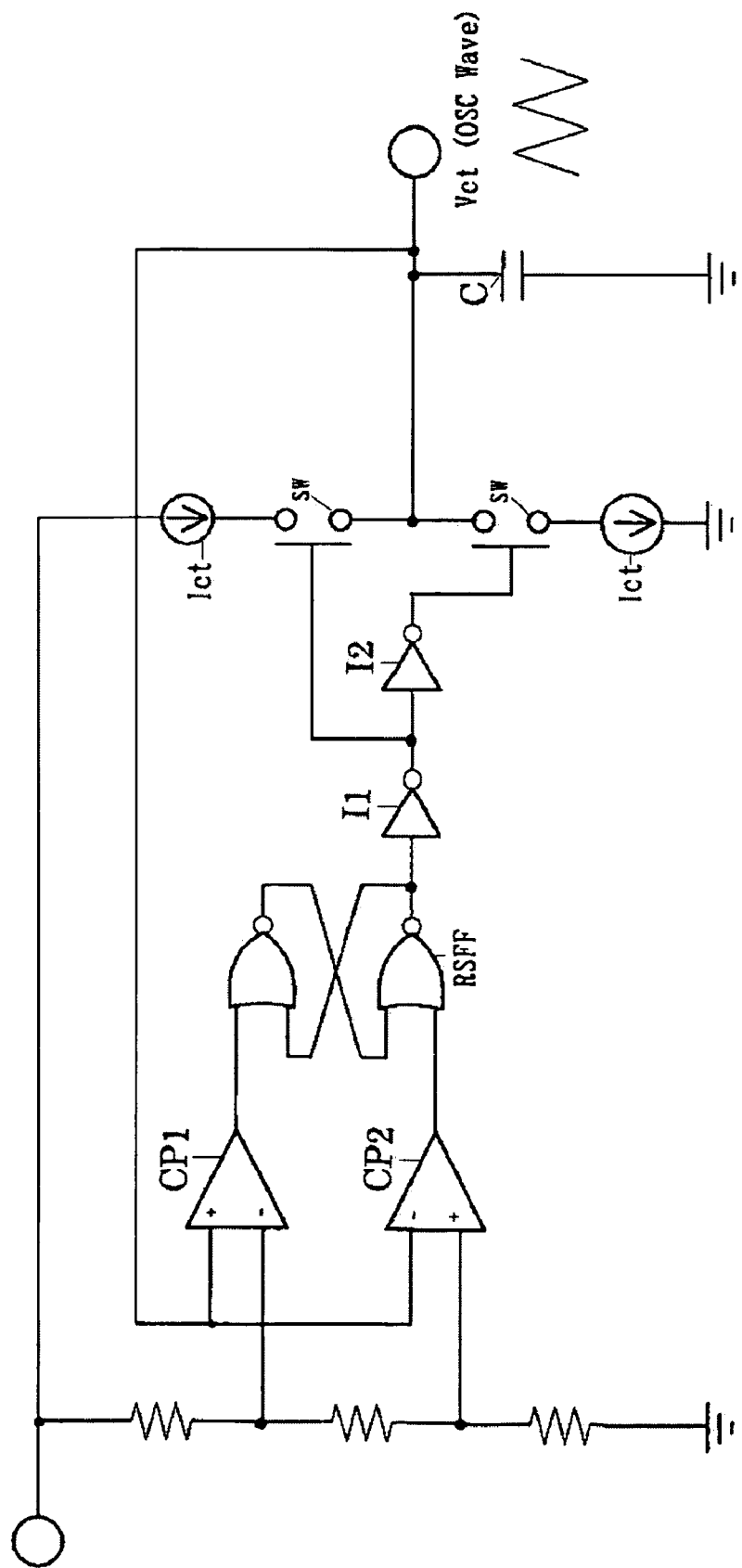
FIG. 6 is a circuit configuration diagram showing a specific example of the circuits OSC and BURSTOSC of FIG. 5.

FIG. 1 is a configuration diagram showing a first embodiment of the invention. In contrast to the conventional example shown in FIG. 5, the control IC is configured by the addition of a signal input terminal ATSTB and a MODE terminal for selecting between manual switching and automatic switching, a SEL portion (comparator), an AUTOH (automatic switching circuit) and an AUTOL portion (automatic switching circuit), various gate circuits NOT1, NAND1, NAND2, OR2, NOR1, NOR2, and N channel MOSFET MN1.

A manual switching/automatic switching determining circuit is configured by the SEL portion comparator and a threshold voltage (set or threshold value voltage) VTH_SEL, and the comparator output signal is inputted to the NAND1 and OR2. The outputs of the NAND1 and OR2 are inputted to the NAND2 and become a signal that drives the gate of the N channel MOSFET MN1. In other words, when the ATSTB terminal voltage is higher than that of the VTH_SEL, a High or Low signal corresponding to the STB terminal appears in the output of the NAND2, and when the ATSTB terminal voltage is lower than that of the VTH_SEL, a signal where the outputs of the AUTOH and AUTOL to which the FB terminal voltage is inputted are synthesized in the NOR1 appears in the output of the NAND2. The AUTOH and AUTOL are automatic switching circuits and comprise threshold voltages VTH_H and VTH_L and the gates NOR1 and NOR2.

A circuit configured by a constant current supply and the MODE terminal connected to the drain terminals of internal power supplies VDD, MN1 and MN1 is an operation delay circuit, and a capacitor for setting a delay time is connected to the MODE terminal. The MODE terminal is fixed to a GND by the MN1 when the output of the NAND2 is High, and is in the normal operating mode. The NAND2 output is inverted and MN1 is switched OFF, whereby the delay time is generated where charging is not conducted by a constant current with respect to the capacitor connected to the terminal. When the MODE terminal voltage rises and becomes High, an OnTB portion signal setting a burst operation in the OR1 output is inputted to AND1 and synthesized with the PWM signal, which becomes the standby operating mode where burst switching is conducted.

Next, a case will be described where the ATSTB terminal voltage is set to VTH_SEL or less, that is, the operation in the automatic switching mode. When the FB terminal voltage is VTH_H or greater, AUTOH (output signal of the comparator of the AUTOH portion) becomes High and AUTOL (output signal of the comparator of the AUTOL portion) becomes Low (VTH_L<VTH_H), and the NAND2 output becomes High. Thus, MN1 is switched ON and the MODE terminal is fixed to GND, which is the normal operating mode. When the FB terminal voltage drops and becomes VTH_L or greater and VTH_H or less, the output of the comparator AUTOH is inverted and becomes Low, but the output of NOR2 remains High. Thus, the inverted result is not transmitted to the next stage on, and MODE terminal remains at GND and in the normal operating mode.

Moreover, when the FB terminal voltage drops and becomes VTH_L or less, the NAND2 output is inverted to Low and MN1 is switched OFF as a result of the signal AUTOL being inverted to High. Thus, charging of the MODE terminal connected capacitor is begun, and when the MODE terminal voltage becomes High, this becomes the standby operating mode.

At this time, when the FB terminal voltage exceeds VTH_L until the MODE terminal voltage becomes High, the signal AUTOL is again inverted, charging of the MODE terminal connected capacitor is interrupted, and the MODE terminal becomes fixed to GND and maintains the normal operating mode. This delay operation is a function for corresponding to sudden changes in the load of the power supply and is configured such that the operating mode of the control IC is not switched when this state does not continue to be maintained for the delay time even when the FB terminal voltage becomes the threshold voltage VTH_L (the threshold to switch from the normal operating mode to the standby operating mode) or less.

The circuit of FIG. 1 has the inherent function of automatically conducting switching between the normal operating mode and the standby operating mode, but is configured to be switched by an external signal in order to have more versatility (to be able to accommodate conventional use). However, because the automatic switching function and the switching function resulting from an external signal will be at odds if left to this configuration, the circuit is configured to select, with the ATSTB terminal, which of the functions to select.

If configured such that a signal is supplied from the outside to the ATSTB terminal, the load of the external circuit increases and there is no longer any purpose in providing an automatic switching function. Thus, the input to the ATSTB terminal is pulled up or pulled down at the portion of the terminal and not connected to another circuit block.

In this case, the STB terminal inputs the signal from the outside only when it has set switching resulting from the external signal. When automatic switching has been set, this terminal is pulled up or pulled down. This is because in the case of automatic switching, the signal inputted from the STB terminal is blocked by NAND1 and there is no longer any purpose, so the input terminal cannot be left open.

Figure 2:
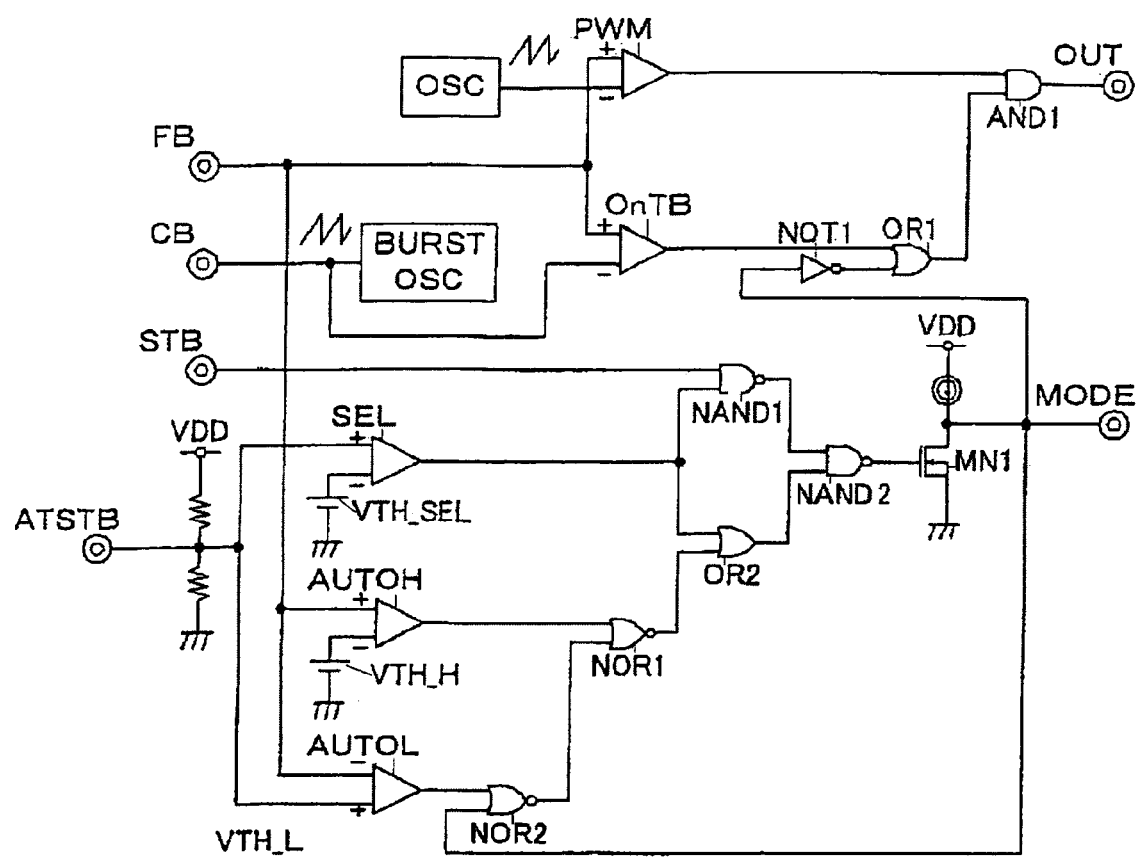
FIG. 2 is a circuit configuration diagram showing a second embodiment of the invention.

FIG. 2 shows a second embodiment of the invention. The second embodiment is characterized in that the threshold voltage VTH_L (for switching between the normal operating mode and the standby operating mode) is created by dividing the internal power supply VDD of the control IC with resistors and connected to the ATSTB terminal, and the rest is the same as FIG. 1. By appropriately setting the voltage VTH_L, a further reduction in external parts becomes possible.

The following three states can be listed in regard to the input to the ATSTB terminal in this case.

(a) Open: reference voltage is imparted to SEL and the AUTOL portion. Automatic switching is automatically set by setting two resistance values that divide VDD such that the reference voltage is <VTH_SEL.

(b) Input High: Switching resulting from external signal is set.

(c) Connect a resistor to terminal outside and adjust reference voltage value.

Figure 3:
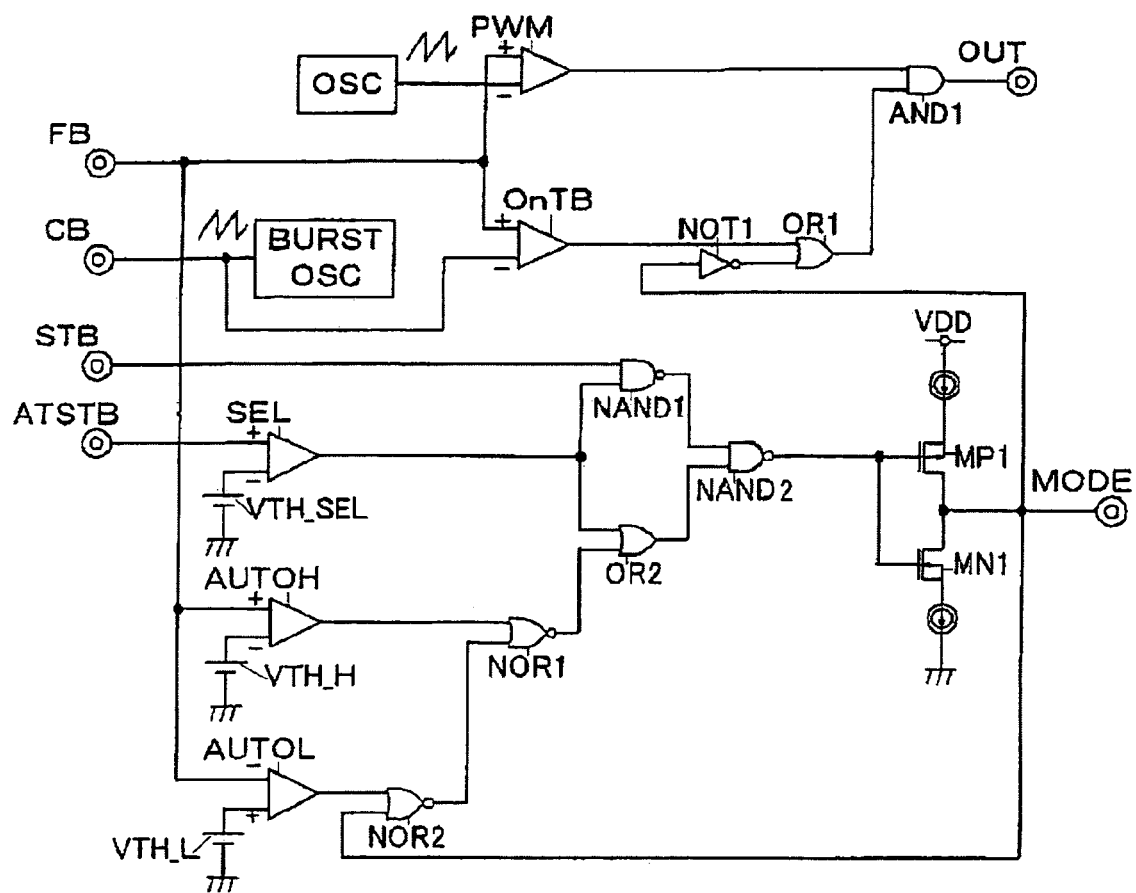
FIG. 3 is a circuit configuration diagram showing a third embodiment of the invention.

FIG. 3 shows a third embodiment of the invention. The third embodiment is one configured such that the operation delay time can be set not only in the standby operating mode moving time but also at the normal operating mode moving time by disposed not just a constant current circuit for charging the MODE terminal connected capacitor but also a discharge-use constant current circuit and PchMOSFET (MP1).

Figure 4:
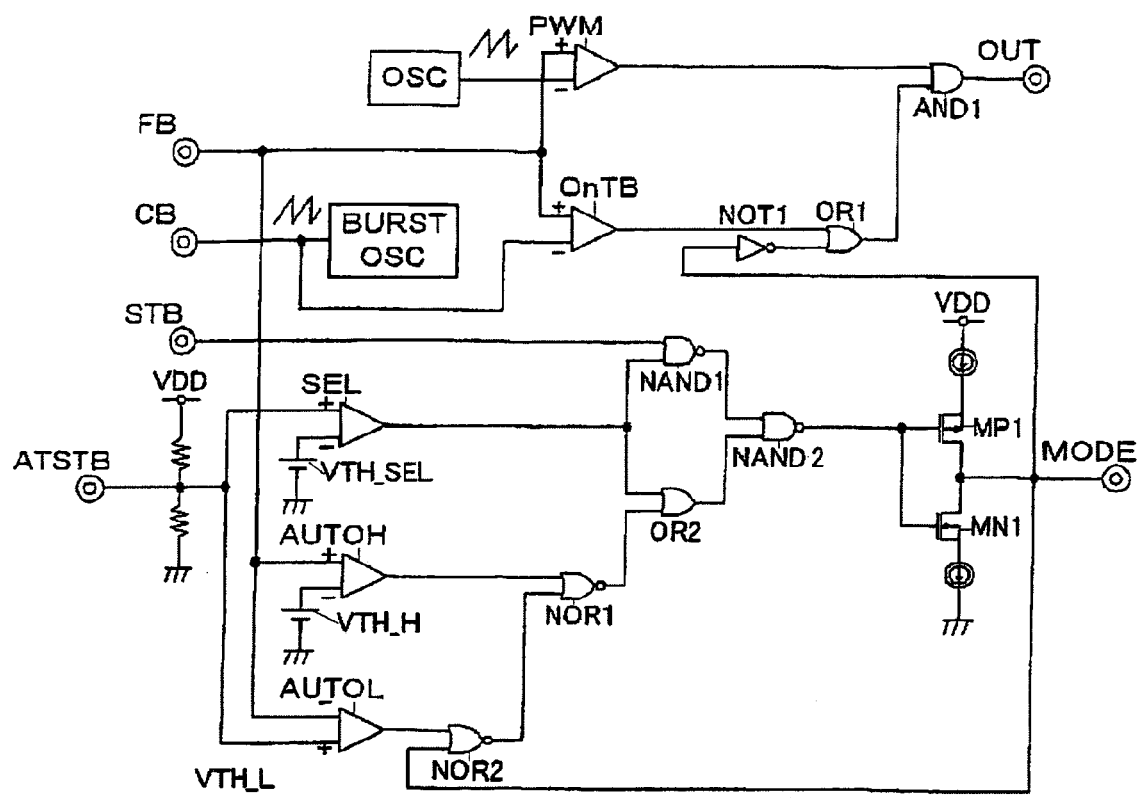
FIG. 4 is a circuit configuration diagram showing a fourth embodiment of the invention.

FIG. 4 shows a fourth embodiment of the invention. As is clear from FIG. 4, the fourth embodiment is one to which the functions of both FIG. 2 and FIG. 3 have been given; in other words, the threshold voltage VTH_L (for switching between the normal operating mode and the standby operating mode) is created by dividing the internal power supply VDD of the control IC with resistors and connected to the ATSTB terminal, and not only the constant current circuit for charging the MODE terminal connected capacitor but also the discharge-use constant current circuit is disposed.

The above assumes the insulated power supply device disclosed in Japanese Patent No. 2,956,681 as the power supply device. Consequently, the signal inputted to the FB terminal is a signal fed back from the transformer secondary side to the primary side via a photocoupler.

However, the present invention is also applicable to a non-insulated power supply device. In this case, an error amp may be inserted after the FB terminal, and the output of the error amp may be connected to the later stage PWM portion, OnTB portion, AUTOH portion, and AUTOL portion. That is, the signal compared with a triangle wave or saw-tooth wave by the PWM comparator becomes an error signal generated by the error amp from the reference voltage and signal fed back from the output of the non-insulated switching power supply.

It will be appreciated by those skilled in the art that numerous variations and modifications are possible, and that the invention may be practiced otherwise than as specifically disclosed herein without departing from the scope thereof.

What is claimed is:

1. An integrated circuit for controlling a switching power supply, the integrated circuit judging whether or not a load is light by comparing a comparison signal with a triangle wave or a saw-tooth wave by using a PWM comparator and switching between a standby operating mode and a normal operating mode in response thereto, the integrated circuit comprising:

a first setting terminal that manually sets, without recourse to the comparison signal, the switching between the standby operating mode and the normal operating mode, and a second setting terminal that sets the switching between the standby operating mode and the normal operating mode either to be automatically performed based upon the comparison signal or to be manually performed without recourse to the comparison signal.

2. The integrated circuit of claim 1, wherein the second setting terminal includes a function of setting a threshold voltage for automatically switching between the normal operating mode and the standby operating mode and is configured such that the threshold voltage is adjustable from outside the integrated circuit.

3. The integrated circuit of claim 2, wherein the threshold voltage is generated by dividing a power supply voltage using a resistive voltage divider.

4. The integrated circuit of claim 1, including a terminal that can set a delay time for switching between the normal operating mode and the standby operating mode after detecting an operating mode switching signal.

5. The integrated circuit of claim 4, wherein the delay time is generated by a charge/discharge circuit comprising a constant current circuit, a switching element and a capacitor.

6. The integrated circuit of claim 1, wherein the comparison signal is a signal fed back from a secondary side of an insulated switching power supply to a primary side thereof via a photocoupler.

7. The integrated circuit of claim 1, wherein the comparison signal is an error signal generated by an error amplifier from a reference voltage and a signal fed back from an output of a non-insulated switching power supply.

* * * * *

UNITED STATES PATENT AND TRADEMARK OFFICE
CERTIFICATE OF CORRECTION

| | |
|---|---|
| PATENT NO. | : 7,667,445 B2 |
| APPLICATION NO. | : 11/472545 |
| DATED | : February 23, 2010 |
| INVENTOR(S) | : Nobuyuki Hiasa |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 537 days.

Signed and Sealed this

Seventh Day of December, 2010

David J. Kappos
*Director of the United States Patent and Trademark Office*